(12) United States Patent
Li et al.

(10) Patent No.: US 10,472,547 B2
(45) Date of Patent: Nov. 12, 2019

(54) COMPOSITE HOT-MELT ADHESIVE NET FILM AND MANUFACTURING PROCESS THEREOF

(71) Applicants: KUNSHAN TIANYANG HOT MELT ADHESIVE CO., LTD., Jiangsu (CN); SHANGHAI TIANYANG HOT MELT ADHESIVE CO., LTD., Shanghai (CN); EAST CHINA UNIVERSITY OF SCIENCE AND TECHNOLOGY, Shanghai (CN)

(72) Inventors: Zhelong Li, Shanghai (CN); Wanyu Zhu, Shanghai (CN); Xingquan Ma, Shanghai (CN); Heji Lei, Shanghai (CN); Zuoxiang Zeng, Shanghai (CN); Yongjian Zhang, Shanghai (CN)

(73) Assignees: KUNSHAN TIANYANG HOT MELT ADHESIVE CO., LTD., Jiangsu (CN); SHANGHAI TIANYANG HOT MELT ADHESIVE CO., LTD., Shanghai (CN); EAST CHINA UNIVERSITY OF SCIENCE AND TECHNOLOGY, Shanghai (CN)

(*) Notice: Subject to any disclaimer, the term of this patent is extended or adjusted under 35 U.S.C. 154(b) by 35 days.

(21) Appl. No.: 15/537,305

(22) PCT Filed: Dec. 16, 2015

(86) PCT No.: PCT/CN2015/097640
§ 371 (c)(1),
(2) Date: Jun. 16, 2017

(87) PCT Pub. No.: WO2016/095823
PCT Pub. Date: Jun. 23, 2016

(65) Prior Publication Data
US 2017/0349792 A1  Dec. 7, 2017

(30) Foreign Application Priority Data

Dec. 19, 2014 (CN) .......................... 2014 1 0795228
Mar. 12, 2015 (CN) .......................... 2015 1 0106668

(51) Int. Cl.
| | |
|---|---|
| C09J 123/06 | (2006.01) |
| C09J 11/04 | (2006.01) |
| C09J 11/06 | (2006.01) |
| C09J 11/08 | (2006.01) |
| D01D 4/02 | (2006.01) |
| D01D 5/084 | (2006.01) |
| D01D 5/088 | (2006.01) |
| C08K 3/26 | (2006.01) |
| C08K 3/34 | (2006.01) |
| C08K 5/13 | (2006.01) |
| C08K 5/134 | (2006.01) |
| D01D 5/08 | (2006.01) |

(52) U.S. Cl.
CPC ............. *C09J 123/06* (2013.01); *C09J 11/04* (2013.01); *C09J 11/06* (2013.01); *C09J 11/08* (2013.01); *D01D 4/02* (2013.01); *D01D 5/084* (2013.01); *D01D 5/088* (2013.01); *C08K 3/26* (2013.01); *C08K 3/34* (2013.01); *C08K 5/13* (2013.01); *C08K 5/134* (2013.01); *C08K 2003/265* (2013.01); *D01D 5/08* (2013.01); *D10B 2321/021* (2013.01); *D10B 2321/022* (2013.01)

(58) Field of Classification Search
CPC ........ B32B 27/00–34; B32B 37/00–12; B32B 2037/1215; B32B 2037/1223; B32B 2037/123; B32B 2038/0076; B32B 2250/02; B32B 2255/10; B32B 2305/38
See application file for complete search history.

(56) References Cited

U.S. PATENT DOCUMENTS 6,042,902 A   3/2000 Kuder et al.

FOREIGN PATENT DOCUMENTS

| CN | 1699491 A   | 11/2005 |
|---|---|---|
| CN | 101429413 A | 5/2009  |
| CN | 101463243 A | 6/2009  |
| CN | 101967733 A | 2/2011  |
| CN | 101240148 B | 2/2012  |
| CN | 103059792 B | 8/2014  |

*Primary Examiner* — Ana L. Woodward
(74) *Attorney, Agent, or Firm* — Muncy, Geissler, Olds & Lowe, PC

(57) ABSTRACT

A composite hot-melt adhesive mesh film and preparation process thereof, in particular, a composite hot-melt adhesive mesh film and preparation process thereof for bonding metal and non-polar material are disclosed. The mesh film is compounded of a polar polyamide hot-melt adhesive and a non-polar polyolefin hot-melt adhesive mesh film containing a compatibilizer. The mesh film has a high adhesive strength and a durable and stable adhesion, and is especially suitable for bonding stainless steel, aluminum, copper or other metal materials and polyethylene, polypropylene or other non-polar polymers. Additionally, the preparation process is completed in one set of production process from raw material pretreatment to the final preparation of the hot melt adhesive mesh film product, thereby greatly reducing production failures, and providing high production efficiency and low costs.

12 Claims, 1 Drawing Sheet

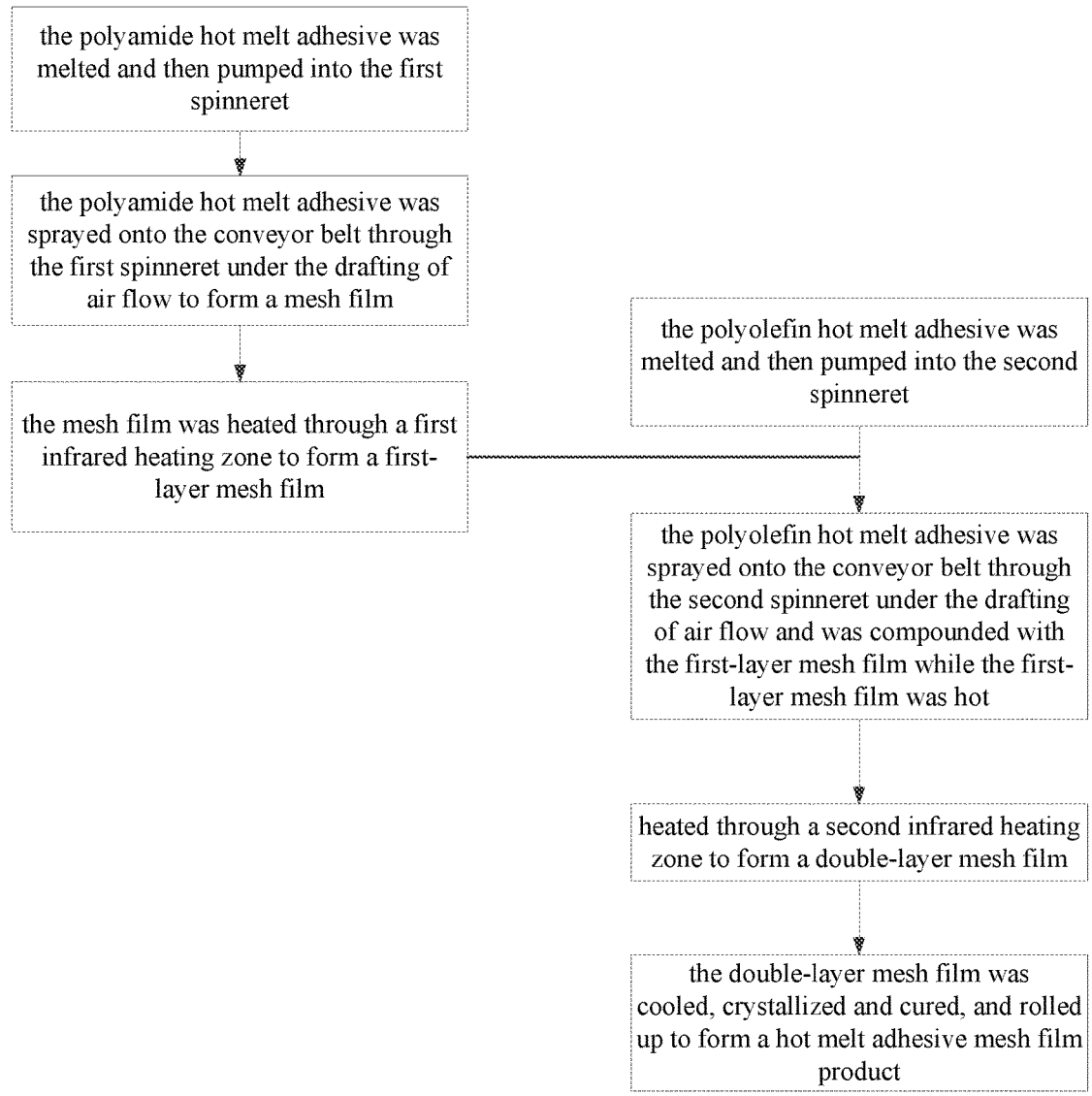

COMPOSITE HOT-MELT ADHESIVE NET FILM AND MANUFACTURING PROCESS THEREOF

TECHNICAL FIELD

The present invention relates to a composite hot melt adhesive mesh film and a preparation process thereof, in particular to a composite hot melt adhesive mesh film for bonding metal and non-polar material, and a preparation process thereof. The composite hot melt adhesive mesh film prepared by the present invention is particularly suitable for bonding metal materials such as stainless steel, aluminum and copper and non-polar polymers such as polyethylene and polypropylene.

BACKGROUND

Hot melt adhesive mesh film is a corrosion-resistant and anti-aging material with good thermal stability, good tensile, anti-bursting and permeability performances, and therefore it is widely applied to clothing, automobiles, electronics and other industries.

CN 101240148 B provides a method for preparing a hot melt adhesive mesh film, including: melting a hot melt adhesive raw material; adding a crystallization nucleating agent; extruding, spinning, air flow drafting, swaying filaments into meshes and other steps. The patent particularly relates to a method for preparing a hot melt adhesive mesh film by using a copolyamide hot melt adhesive as a raw material. CN 101967733 B provides a method for preparing a hot melt adhesive mesh film with uniform pore size and stable gram weight, which is prepared by controlling the melting temperature, spinning speed, infrared temperature, etc. of a hot melt adhesive. The patent particularly relates to a method for preparing a hot melt adhesive mesh film by using a polyester hot melt adhesive as a raw material. CN 103059792 B provides a polyester elastomer hot melt adhesive for bonding polar polymers and metal materials, and a preparation method thereof. CN 1699491A also discloses a method for preparing a hot melt adhesive film, which is particularly applicable to a double-sided hot melt adhesive film for use in mounting of calligraphy and painting.

With the development of industrialization, the bonding of polar materials and non-polar materials is required in more and more fields, in order to reduce the cost and expanding the application field of the materials. However, at present, the conventional hot melt adhesive related products, such as a mesh film or an adhesive film, are basically used for bonding polar materials, and their bonding performance for non-polar materials is poor.

SUMMARY OF THE INVENTION

An objective of the present invention is to overcome the drawbacks of the prior art and to provide a composite hot melt adhesive mesh film and a preparation process thereof. The composite hot melt adhesive mesh film prepared by the present invention has high bonding strength and is able to provide a lasting and stable bonding, and is especially suitable for bonding metal materials such as stainless steel, aluminum and copper and non-polar polymers such as polyethylene and polypropylene.

The technical scheme adopted by the present invention is as follows:

A composite hot melt adhesive mesh film, which is compounded by a polyamide hot melt adhesive mesh film and a polyolefin hot melt adhesive mesh film, wherein: a polyamide hot melt adhesive used for producing the polyamide hot melt adhesive mesh film has a differential scanning calorimetry final melting point of 116° C. to 130° C. and a melt flow rate of 30 g/10 min/160° C. to 50 g/10 min/160° C.; a polyolefin hot melt adhesive used for producing the polyolefin hot melt adhesive mesh film comprises the following components in mass by percentage: 8% to 15% of compatibilizer, 50% to 70% of polyethylene, 3% to 10% of other polyolefin, 0.2% to 0.8% of initiator, 0.7% to 1.3% of silane coupling agent, 8% to 20% of tackifier, 1.0% to 10% of inorganic filler and 0.4% to 0.8% of antioxidant.

The compatibilizer may be one selected from maleic anhydride grafted high density polyethylene, maleic anhydride grafted low density polyethylene, maleic anhydride grafted polypropylene, and maleic anhydride grafted linear low density polyethylene, and the grafting rate of maleic anhydride may be 0.8% to 1.2%.

The polyethylene may be one selected from high density polyethylene, low density polyethylene and linear low density polyethylene, and the melt flow rate of the polyethylene may be 0.9 g/10 min/190° C. to 7 g/10 min/190° C.

The other polyolefin may be one selected from ethylene-octene copolymer, polypropylene and polystyrene, and the melt flow rate of the polyolefin may be 1.6 g/10 min/190° C. to 14 g/10 min/190° C.

The initiator may be one selected from benzoyl peroxide, di-t-butyl peroxide and azobisisobutyronitrile.

The silane coupling agent may be one selected from vinyltrioxysilane and γ-aminopropyltrimethoxysilane.

The tackifier may be one selected from rosin 145, terpene resin and hydrogenated carbon-5 resin.

The inorganic filler may be one selected from talc, kaolin and nano calcium carbonate.

The antioxidant may be one selected from antioxidant 1010, antioxidant BHT and antioxidant 264.

A preparation process of a composite hot melt adhesive mesh film, taking the polyamide hot melt adhesive and the polyolefin hot melt adhesive used for producing the aforementioned composite hot melt adhesive mesh film as raw materials and performing the following steps:

1) melting and respectively pumping the polyamide hot melt adhesive and the polyolefin hot melt adhesive into a first spinneret and a second spinneret that are independent from each other;

2) spraying the polyamide hot melt adhesive onto a conveyor belt at a first preset speed through the first spinneret under drafting of a first air flow, and then heating the polyamide hot melt adhesive through a first infrared heating zone, so as to form a first-layer mesh film;

3) spraying the polyolefin hot melt adhesive onto the conveyor belt at a second preset speed through the second spinneret under drafting of a second air flow, compounding the polyolefin hot melt adhesive with the first-layer mesh film while the first-layer mesh film is hot, and then heating the compounded polyolefin hot melt adhesive and first-layer mesh film through a second infrared heating zone, so as to form a double-layer composite mesh film; and 4) cooling, crystallizing, curing and rolling up the double-layer composite mesh film to form the composite hot melt adhesive mesh film.

The temperature of the first spinneret may be lower than that of the second spinneret. The temperature of the first spinneret may be 170° C. to 210° C., and the temperature of the second spinneret may be in a range of 180° C. to 230° C.

The first preset speed may be greater than the second preset speed. The first preset speed may be 15 m/min to 30 m/min, and the second preset speed may be 10 m/min to 25 m/min.

The speed of the first air flow may be greater than the speed of the second air flow, and each of the speed of the first air flow and the second air flow may be in a range of 30 m/min to 120 m/min.

The temperature of the first infrared heating zone may be higher than that of the second infrared heating zone. The temperature of the first infrared heating zone may be 90° C. to 120° C., and the temperature of the second infrared heating zone may be 60° C. to 90° C.

The speed of the conveyor belt may be 12 m/min to 20 m/min, and the distance between the first spinneret and the second spinneret may be 0.7 m to 1.3 m.

The present invention has the beneficial effects that: the composite hot melt adhesive mesh film and the preparation process thereof provided by the present invention adopt a specific formula, so that the polar polyamide hot melt adhesive and the compatibilizer-containing non-polar polyolefin are effectively melted; and the composite hot melt adhesive mesh film prepared according to the invention has high bonding strength and is able to provide lasting and stable bonding, and is particularly suitable for bonding metal materials such as stainless steel, aluminum and copper and non-polar materials such as polyethylene and polypropylene. Besides, the preparation process provided by the present invention is completed in one set of production process from raw material pretreatment to the final preparation of the hot melt adhesive mesh film product, thereby greatly reducing the production failures, improving the production efficiency and reducing the cost.

BRIEF DESCRIPTION OF THE DRAWINGS

The sole FIGURE is a flow chart of a preparation process provided by the present invention.

DETAILED DESCRIPTION

Example 1

A composite hot melt adhesive mesh film was compounded by a polyamide hot melt adhesive mesh film and a polyolefin hot melt adhesive mesh film. The DSC (Differential Scanning calorimetry) final melting point of the polyamide hot melt adhesive was measured to be 122° C. by a DSC method, and the melt flow rate was 30 g/10 min/160° C. The polyolefin hot melt adhesive includes the following components by mass percentage:

8% of maleic anhydride grafted high density polyethylene (grafting rate: 1%);
50% of high density polyethylene (melt flow rate: 0.9 g/10 min/190° C.);
10% of ethylene-octene copolymer (melt flow rate: 1.6 g/10 min/190° C.);
0.2% of benzoyl peroxide;
1% of vinyltrioxysilane;
20% of rosin 145;
10% of talc; and
0.8% of antioxidant 1010.

A preparation process of the composite hot melt adhesive mesh film was conducted as follows: the polyamide hot melt adhesive and the polyolefin hot melt adhesive were melted and then pumped into a first and a second spinneret respectively, wherein the first and second spinnerets were independent from each other; the two spinnerets were arranged above a conveyor belt with the second spinneret positioned downstream to the first spinneret along a conveying direction of the conveyor belt, and the distance between the two spinnerets was 0.7 m; upon activation of the conveyor belt (such as a steel belt), the conveying speed of the conveyor belt was adjusted to 12 m/min; the first spinneret was started, an interior temperature thereof was adjusted to 170° C. and an air flow (such as compressed air) speed was adjusted to 120 m/min, so that the spinning speed was 20 m/min under the action of air flow draft and discharge pressure of the spinneret; the polyamide hot melt adhesive was sprayed onto the conveyor belt through the first spinneret under the drafting of air flow to form a mesh film; the mesh film was heated through a first infrared heating zone having a temperature of 100° C. to form a first-layer mesh film, wherein the first infrared heating zone could be positioned, for example, at a suitable location between the two spinnerets; the second spinneret was started, the interior temperature thereof was adjusted to 180° C. and the air flow (such as compressed air) speed was adjusted to 85 m/min, so that the spinning speed was 12 m/min, and the polyolefin hot melt adhesive was sprayed onto the conveyor belt through the second spinneret under the drafting of air flow and was compounded with the first-layer mesh film conveyed to the second spinneret while the first-layer mesh film was hot, and then the compounded polyolefin hot melt adhesive and first-layer mesh film was heated through a second infrared heating zone having a temperature of 60° C. to form a double-layer mesh film, wherein the second infrared heating zone could be positioned, for example, downstream the second spinneret; and then the double-layer composite mesh film was cooled, crystallized and cured, and rolled up to form a final hot melt adhesive mesh film product used for bonding metal and a non-polar material.

The product obtained according to the formula and the preparation process in Example 1 was labeled A.

Example 2

A composite hot melt adhesive mesh film was compounded by a polyamide hot melt adhesive mesh film and a polyolefin hot melt adhesive mesh film. The DSC final melting point of the polyamide hot melt adhesive was 116° C. and the melt flow rate was 50 g/10 min/160° C.; the polyolefin hot melt adhesive includes the following components by mass percentage:

15% of maleic anhydride grafted low density polyethylene (grafting rate: 1.2%);
60% of linear low density polyethylene (melt flow rate: 2 g/10 min/190° C.);
5% of ethylene-octene copolymer (melt flow rate: 3 g/10 min/190° C.);
0.4% of di-t-butyl peroxide;
1.3% of γ-aminopropyltrimethoxysilane;
10% of hydrogenated carbon-5 resin;
7.7% of nano calcium carbonate; and
0.6% of antioxidant 1010.

A preparation process of the composite hot melt adhesive mesh film was conducted as follows: the polyamide hot melt adhesive and the polyolefin hot melt adhesive were melted and then pumped into a first and a second spinneret respectively, wherein the first and second spinnerets were independent from each other and spaced apart from each other by a distance of 0.7 m; upon activation of the conveyor belt (such as a steel belt), the conveying speed of the conveyor belt was adjusted to 12 m/min; the first spinneret was started, the interior temperature thereof was adjusted to 170° C., the spinning speed was adjusted to 20 m/min, the air flow (such as compressed air) speed was adjusted to 120 m/min, and the polyamide hot melt adhesive was sprayed onto the conveyor belt through the first spinneret under the drafting of air flow to form a mesh film; the mesh film was heated through a first infrared heating zone having a temperature of 100° C. to form a first-layer mesh film; the second spinneret was started, the interior temperature thereof was adjusted to 180° C., the spinning speed was adjusted to 12 m/min, the air flow (such as compressed air) speed was adjusted to 85 m/min, and the polyolefin hot melt adhesive was sprayed onto the conveyor belt through the second spinneret under the drafting of air flow and was compounded with the first-layer mesh film conveyed to the second spinneret while the first-layer mesh film was hot, and then the compounded polyolefin hot melt adhesive and first-layer mesh film was heated through a second infrared heating zone having a temperature of 60° C. to form a double-layer mesh film; and then the double-layer composite mesh film was cooled, crystallized and cured, and rolled up to form a final hot melt adhesive mesh film product used for bonding metal and a non-polar material.

The product obtained according to the formula and the preparation process in Example 2 was labeled B.

Example 3

A composite hot melt adhesive mesh film was compounded by a polyamide hot melt adhesive mesh film and a polyolefin hot melt adhesive mesh film. The DSC final melting point of the polyamide hot melt adhesive was 130° C. and the melt flow rate was 45 g/10 min/160° C.; the polyolefin hot melt adhesive includes the following components by mass percentage:

10% of maleic anhydride grafted linear low density polyethylene (grafting rate: 1%);

65% of low density polyethylene (melt flow rate: 7 g/10 min/190° C.);

3% of polystyrene (melt flow rate: 10 g/10 min/190° C.);

0.8% of azobisisobutyronitrile;

0.7% of γ-aminopropyltrimethoxysilane;

15% of terpene resin;

5% of kaolin; and 0.5% of antioxidant BHT.

A preparation process of the composite hot melt adhesive mesh film was conducted as follows: the polyamide hot melt adhesive and the polyolefin hot melt adhesive were melted and then pumped into a first and a second spinneret respectively, wherein the first and second spinnerets were independent from each other and spaced apart from each other by a distance of 1.1 m; upon activation of the conveyor belt (such as a steel belt), the conveying speed of the conveyor belt was adjusted to 17 m/min; the first spinneret was started, the interior temperature thereof was adjusted to 190° C., the spinning speed was adjusted to 23 m/min, the air flow (such as compressed air) speed was adjusted to 115 m/min, and the polyamide hot melt adhesive was sprayed onto the conveyor belt through the first spinneret under the drafting of air flow to form a mesh film; the mesh film was heated through a first infrared heating zone having a temperature of 120° C. to form a first-layer mesh film; the second spinneret was started, the interior temperature thereof was adjusted to 210° C., the spinning speed was adjusted to 16 m/min, the air flow (such as compressed air) speed was adjusted to 90 m/min, and the polyolefin hot melt adhesive was sprayed onto the conveyor belt through the second spinneret under the drafting of air flow and was compounded with the first-layer mesh film conveyed to the second spinneret while the first-layer mesh film was hot, and then the compounded polyolefin hot melt adhesive and first-layer mesh film was heated through a second infrared heating zone having a temperature of 80° C. to form a double-layer mesh film; and then the double-layer composite mesh film was cooled, crystallized and cured, and rolled up to form a final hot melt adhesive mesh film product used for bonding metal and a non-polar material.

The product obtained according to the formula and the preparation process in Example 3 was labeled C.

Example 4

A composite hot melt adhesive mesh film was compounded by a polyamide hot melt adhesive mesh film and a polyolefin hot melt adhesive mesh film. The DSC final melting point of the polyamide hot melt adhesive was 124° C. and the melt flow rate was 35 g/10 min/160° C.; the polyolefin hot melt adhesive includes the following components by mass percentage:

13% of maleic anhydride grafted polyethylene (grafting rate: 1.2%);

70% of low density polyethylene (melt flow rate: 4 g/10 min/190° C.);

6% of polypropylene (melt flow rate: 14 g/10 min/190° C.);

0.7% of benzoyl peroxide;

0.9% of vinyltrioxysilane;

8% of terpene resin;

1% of nano calcium carbonate; and 0.4% of antioxidant 264.

A preparation process of the composite hot melt adhesive mesh film was conducted as follows: the polyamide hot melt adhesive and the polyolefin hot melt adhesive were melted and then pumped into a first and a second spinneret respectively, wherein the first and second spinnerets were independent from each other and spaced apart from each other by a distance of 1.3 m; upon activation of the conveyor belt (such as a steel belt), the conveying speed of the conveyor belt was adjusted to 20 m/min; the first spinneret was started, the interior temperature thereof was adjusted to 200° C., the spinning speed was adjusted to 26 m/min, the air flow (such as compressed air) speed was adjusted to 100 m/min, and the polyamide hot melt adhesive was sprayed onto the conveyor belt through the first spinneret under the drafting of air flow to form a mesh film; the mesh film was heated through a first infrared heating zone having a temperature of 110° C. to form a first-layer mesh film; the second spinneret was started, the temperature thereof was adjusted to 230° C., the spinning speed was adjusted to 18 m/min, the air flow (such as compressed air) speed was adjusted to 80 m/min, and the polyolefin hot melt adhesive was sprayed onto the conveyor belt through the second spinneret under the drafting of air flow and was compounded with the first-layer mesh film conveyed to the second spinneret while the first-layer mesh film was hot, and then the compounded polyolefin hot melt adhesive and first-layer mesh film was heated through a second infrared heating zone having a temperature of 90° C. to form a double-layer mesh film; and then the double-layer composite mesh film was cooled, crystallized and cured, and rolled up to form a final hot melt adhesive mesh film product used for bonding metal and a non-polar material.

The product obtained according to the formula and the preparation process in Example 4 was labeled D.

Performance Testing

The 180-degree peeling strength of the hot melt adhesive mesh films obtained from the above Examples was investigated when being hot-pressed for 120 s at a temperature of 160° C. under pressure of 0.3 MPa to bond PE/aluminum, PP/aluminum, PE/stainless steel and PP/stainless steel, and the specific test results were shown in Table 1 below:

TABLE 1

Bonding strength of hot melt adhesive mesh films for different substrates

| | 180-degree peeling strength (N/25 mm) | | | |
|---|---|---|---|---|
| Products | PE/aluminum | PP/aluminum | PE/stainless steel | PP/stainless steel |
| A | 102 | 115 | 110 | 112 |
| B | 115 | 123 | 119 | 125 |
| C | 110 | 117 | 113 | 119 |
| D | 113 | 119 | 117 | 120 |

From the above table, it is apparent that the composite hot melt adhesive mesh films prepared according to the present invention have high bonding strength and are able to provide lasting and stable bonding, and are particularly suitable for bonding metal materials such as stainless steel, aluminum and copper and non-polar polymers such as polyethylene and polypropylene. The preparation process provided by the present invention is completed in one set of production process from raw material pretreatment to the final preparation of the hot melt adhesive mesh film product, thereby greatly reducing the production failures, improving the production efficiency and reducing the cost.

The invention claimed is:

1. A preparation process of a composite hot melt adhesive mesh film, comprising the following steps:
   1) providing a polyamide hot melt adhesive and a polyolefin hot melt adhesive as raw materials to produce the composite hot melt adhesive, wherein the polyamide hot melt adhesive has a differential scanning calorimetry final melting point of 116° C. to 130° C. and a melt flow rate of 30 g/10 min/160° C. to 50 g/10 min/160° C. and the polyolefin hot melt adhesive comprises the following components in mass by percentage taking the total of the following components as 100%: 8% to 15% of compatibilizer, 50% to 70% of polyethylene, 3% to 10% of other polyolefin, 0.2% to 0.8% of initiator, 0.7% to 1.3% of silane coupling agent, 8% to 20% of tackifier, 1.0% to 10% of inorganic filler and 0.4% to 0.8% of antioxidant,
   wherein the compatibilizer is maleic anhydride grafted low density polyethylene and the silane coupling agent is vinyltrioxysilane or γ-aminopropyltrimethoxysilane;
   2) melting and pumping the polyamide hot melt adhesive and the polyolefin hot melt adhesive into a first spinneret and a second spinneret that are independent from each other respectively;
   3) spraying the polyamide hot melt adhesive onto a conveyor belt at a first preset speed through the first spinneret under drafting of a first air flow, and then heating the polyamide hot melt adhesive through a first infrared heating zone;
   4) spraying the polyolefin hot melt adhesive onto the polyamide hot melt adhesive-containing conveyor belt from step 3) at a second preset speed through the second spinneret under drafting of a second air flow, stacking the polyolefin hot melt adhesive with the polyamide hot melt adhesive while the polyamide hot melt adhesive is hot, and then heating the stacked the polyolefin hot melt adhesive and the polyamide hot melt adhesive through a second infrared heating zone, so as to form a stacked polyolefin hot melt adhesive and polyamide hot melt adhesive; and
   5) cooling, crystallizing, curing and rolling up the stacked polyolefin hot melt adhesive and polyamide hot melt adhesive to form the composite hot melt adhesive.

2. The preparation process of the composite hot melt adhesive according to claim 1, wherein: the first spinneret has a temperature lower than a temperature of the second spinneret; the first preset speed is greater than the second preset speed; the first air flow has a speed greater than a speed of the second air flow; and the first infrared heating zone has a temperature higher than a temperature of the second infrared heating zone.

3. The preparation process of the composite hot melt adhesive according to claim 2, wherein the first spinneret has a temperature of 170° C. to 210° C., and the second spinneret has a temperature of 180° C. to 230° C.

4. The preparation process of the composite hot melt adhesive according to claim 2, wherein the first preset speed is 15 m/min to 30 m/min, and the second preset speed is 10 m/min to 25 m/min.

5. The preparation process of the composite hot melt adhesive according to claim 2, wherein each of the speed of the first air flow and the speed of the second air flow is in a range of 30 m/min to 120 m/min.

6. The preparation process of the composite hot melt adhesive according to claim 2, wherein the first infrared heating zone has a temperature of 90° C. to 120° C., and the second infrared heating zone has a temperature of 60° C. to 90° C.

7. The preparation process of the composite hot melt adhesive according to claim 1, wherein a distance between the first spinneret and the second spinneret is 0.7 m to 1.3 m, and the conveyor belt has a conveying speed of 12 m/min to 20 m/min.

8. The preparation process of the composite hot melt adhesive according to claim 1, wherein the maleic anhydride has a grafting rate of 0.8% to 1.2%.

9. The preparation process of the composite hot melt adhesive according to claim 1, wherein the polyethylene is low density polyethylene having a melt flow rate of 0.9 g/10 min/190° C. to 7 g/10 min/190° C.

10. The preparation process of the composite hot melt adhesive according to claim 1, wherein the other polyolefin is ethylene-octene copolymer having a melt flow rate of 1.6 g/10 min/190° C. to 14 g/10 min/190° C.

11. The preparation process of the composite hot melt adhesive according to claim 1, wherein the initiator is one selected from the group consisting of benzoyl peroxide, di-t-butyl peroxide and azobisisobutyronitrile.

12. The preparation process of the composite hot melt adhesive according to claim 1, wherein the inorganic filler is one selected from the group consisting of talc, kaolin and nano calcium carbonate.

* * * * *